Figure 1:
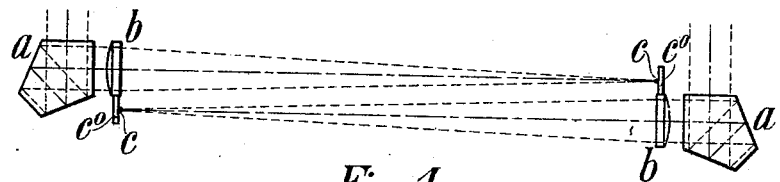

O. EPPENSTEIN.
TELEMETER.
APPLICATION FILED NOV. 24, 1908.

943,109.

Patented Dec. 14, 1909.

Witnesses:
Paul Krüger
Fritz Sander

Inventor:
Otto Eppenstein

UNITED STATES PATENT OFFICE.

OTTO EPPENSTEIN, OF JENA, GERMANY, ASSIGNOR TO THE FIRM OF CARL ZEISS, OF JENA, GERMANY.

TELEMETER.

943,109.  Specification of Letters Patent.  Patented Dec. 14, 1909.

Application filed November 24, 1908. Serial No. 464,308.

*To all whom it may concern:*

Be it known that I, OTTO EPPENSTEIN, a citizen of the German Empire, and residing at Carl-Zeiss strasse, Jena, in the Grand Duchy of Saxe-Weimar, Germany, have invented a new and useful Telemeter, of which the following is a specification.

The invention relates to telemeters, which, for projecting two different real images of the object, are fitted at each end of their base-line with a pair of optical objective parts, each pair comprising one lens and one optical square prism of any desired sequence, and which have a measuring mark system for each image, which also may consist of a single mark. This well known arrangement—on account of the properties of the optical square prisms—renders the telemeter fairly secure against derangement, *i. e.*, against any alteration, not produced by the measuring device, in the difference existing between the position of one image relatively to its system of marks and the position of the other image relatively to the other mark system. The most effective of the causes of derangement still remaining consists in the displacement of an objective part, being the hinder one in the pair, in the sighting plane and at right angles to the base-line. If the lens forms this hinder objective part, its axis lies in the direction of the base-line. It is therefore quite evident that in this case the displacement of the lens in the sighting plane and at right angles to the base-line also produces a displacement of the image against the mark system, likewise in the sighting plane and simultaneously in the plane of the mark field. If the optical square prism forms the hinder objective part, the axis of the lens lies then at right angles to the base-line. By displacing the prism in the sighting plane and again at right angles to the base-line, the position of the pencil system having passed from the lens to the prism is therefore not altered within the latter, *i. e.*, the pencil system and also the image arising therefrom is displaced with the prism.

The present invention consists in such an arrangement of the telemeters under consideration, that displacing a hinder objective part in the sighting plane and at right angles to the base-line produces no further derangement. For this purpose each system of measuring marks is placed on an objective lens or else on the objective prism, if this latter forms the hinder objective part, and in a field lying at right angles to the axis of the lens. It is then easy to project the real images of the object in both mark fields in such a manner that the displacement of a hinder objective part in the direction mentioned does not alter the difference existing in the position of either object image relatively to the mark system in the field of which it is projected.

In a constructional form of this arrangement the two pairs of objective parts are arranged in such a manner, that each real image of the object is formed in the mark field situated at the end of the base-line opposite to that where the lens used in producing the image lies. By displacing a hinder objective part in the sighting plane and at right angles to the base-line, the position of each mark system relatively to the respective image of the object projected in the field thereof is altered to an equal extent and in the same direction.

In another constructional form two plane mirror surfaces having an invariable position relative to each other are employed in producing the images of the object. These two mirror surfaces are arranged in such a manner between both pairs of objective parts, that an image of the object is projected, by each pair and the respective mirror surface, in the mark field adjoining this pair, that is, at the same end of the base-line. In this case, the displacement of a hinder objective part in the sighting plane and at right angles to the base-line produces no relative displacement whatever of a mark system and the image of the object projected in the field thereof, and a rotation of both mirror surfaces in the sighting plane only produces an equal and similarly directed displacement of each image of the object in its respective mark field.

Figure 2:
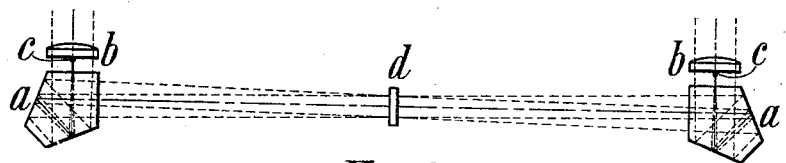
Figure 3:
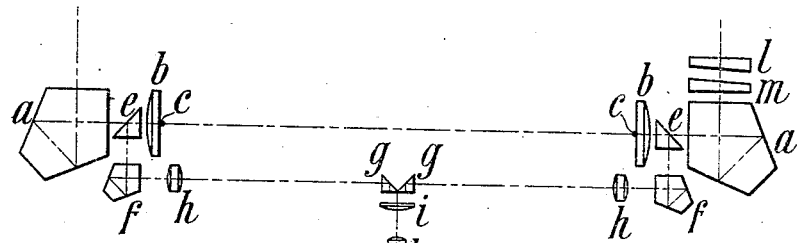
Figure 4:
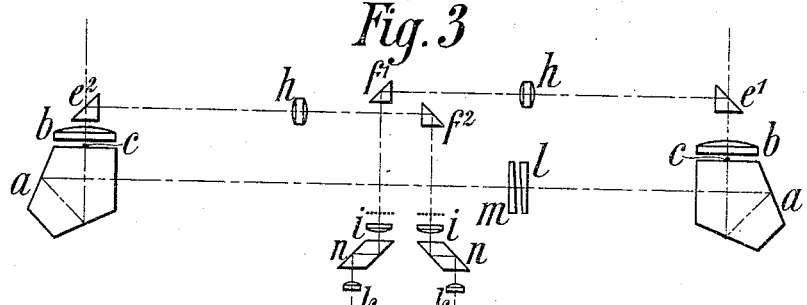
Figure 5:
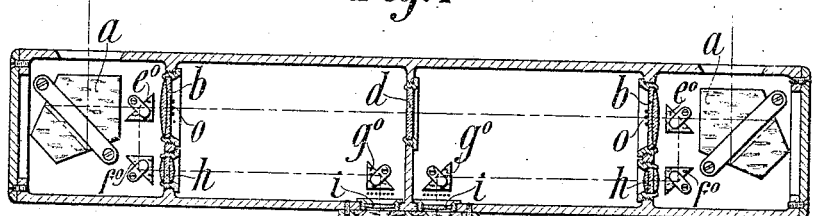

In the annexed drawing: Figure 1 is the plan view of the objective parts of a telemeter, combined according to the invention with the measuring mark systems. Fig. 2 is the plan view of the objective parts of a second telemeter, combined with the measuring mark systems and a double mirror. Fig. 3 is the plan view of the optical parts of a monocular telemeter with measuring mark systems. Fig. 4 is the plan view of the optical parts of a stereoscopic telemeter with traveling mark. Fig. 5 is a sectional plan view of a stereoscopic telemeter with fixed scale.

In Fig. 1 the optical square prisms $a$ have been chosen as the front objective parts and the lenses $b$ as the hinder objective parts, in Fig. 2 the contrary arrangement takes place. The mark systems $c$ consisting of single marks are placed on the lenses $b$, in Fig. 2 directly, in Fig. 1 through the intermediation of a special member $c^0$. In Fig. 1 the rays entering at one end of the base-line are combined into an image in the mark field at the other end of the base-line. In Fig. 2 the double mirror $d$ acts so that each image is formed in the mark field at the same end of the base line, where the rays combined in it have entered.

The telemeter shown in Fig. 3 is constructed with the sequence of the objective parts and the distribution of the images on the mark fields as in Fig. 1, but with the arrangement of the marks as in Fig. 2. Two optical arrangements, each comprising reflecting prisms $e\ f\ g$, an objective lens $b$ and an inverting lens system $h$, produce from each object image and the mark $c$ appertaining to it a real image (in this case erect) on the hinder surfaces of the two prisms $g$ lying adjacent to one another. These two images, the left one produced by rays entering at the right end of the base-line and the right one by rays entering at the left end, are available to be simultaneously observed through the Ramsden ocular $i\ k$. The two refracting prisms $l\ m$ are rotatable and form the well-known part of the measuring device which serves for shifting one image. The Ramsden ocular $i\ k$ forms with each of the inverting lenses $h$ a terrestrial ocular, to which can also be given one of the arrangements known in such oculars for altering the magnifying power of the telescope. It may be remarked, that the set of two equal objectives provided with marks and situated at a distance apart equal to their focal length is already known. Le Cyre made use of such an arrangement in his so-called biaxial sighting telescope.

The stereoscopic telemeter with traveling mark shown in Fig. 4 is of that well-known description, in which the alteration of the relative position of the stereoscopic mark image and of the stereoscopic object image in the direction of the depth is effected by shifting one or both of the real images of the object. In the present case both images are operated upon by the rotatable prisms $l$ and $m$. The objective parts lie as in Fig. 2, the marks $c$ being arranged on the prisms $a$. For reproducing, in the focal plane of the oculars $i\ k$, the images combined with the marks, the inverting lenses $h$, in addition to the objective lenses $b$, are again made use of, further, for the right image the prisms $e^1$ and $f^1$, for the left image the prisms $e^2$ and $f^2$. Rhomboidal prisms $n$ allow of adapting the distance between the oculars to the inter-pupillary distance by rotating each ocular about the axis of its field lens $i$.

In the stereoscopic telemeter with fixed scale the objective parts are arranged according to the sequence shown in Fig. 1 and are combined with the double mirror $d$ shown in Fig. 2. The mark systems $o$, through the stereoscopic combination of which the stereoscopic measuring scale is formed, are arranged on the objectives $b$ and indicated in the drawing each by three marks. Since on both sides of the instrument the object image in the mark field, on account of the co-action of a reflecting surface from $d$ in its production, is only inverted in the vertical direction, the three simple reflecting prisms $e^0\ f^0\ g^0$, in combination with the objective lens $b$ and the inverting lens system $h$, suffice to reproduce this image, along with its mark system $o$, between the prism $g^0$ and the field lens $i$ of the ocular, in an erect position. The oculars $i\ k$ are made eccentric in this case also by the interpolation of rhomboidal prisms and each is, moreover, rotatable about the axis of its field lens $i$, so that the distance between the eye-lenses $k$ can be made equal to any inter-pupillary distance. Other arrangements for regulating the distance between the oculars can be employed, as, for example, anyone of those according to the application for patent, Serial No. 379,564.

I claim:

1. In a telemeter two pairs of objective parts, one at one end of the base-line and the other at the other, each pair comprising an objective lens and an optical square prism, two mark systems, one fixed to one of the objective parts of one pair and the other to one of the objective parts of the other pair, one of the images projected by the objective lenses lying in the field of one mark system and the other image in the field of the other mark system, and an ocular system for the two images.

2. In a telemeter two pairs of objective parts, one at one end of the base-line and the other at the other, each pair comprising an objective lens and an optical square prism, two mark systems, one fixed to one of the objective parts of one pair and the other to one of the objective parts of the other pair, a double mirror, the reflecting surfaces of which co-act with the objective lenses to project each image into the field of the mark system at that end of the base line where the rays forming the image entered, and an ocular system for the two images.

OTTO EPPENSTEIN.

Witnesses:
  PAUL KRÜGER,
  FRITZ SANDER.